D. C. ADKINS.
GEARING.
APPLICATION FILED JULY 8, 1915.
1,197,090.
Patented Sept. 5, 1916.
2 SHEETS—SHEET 1.
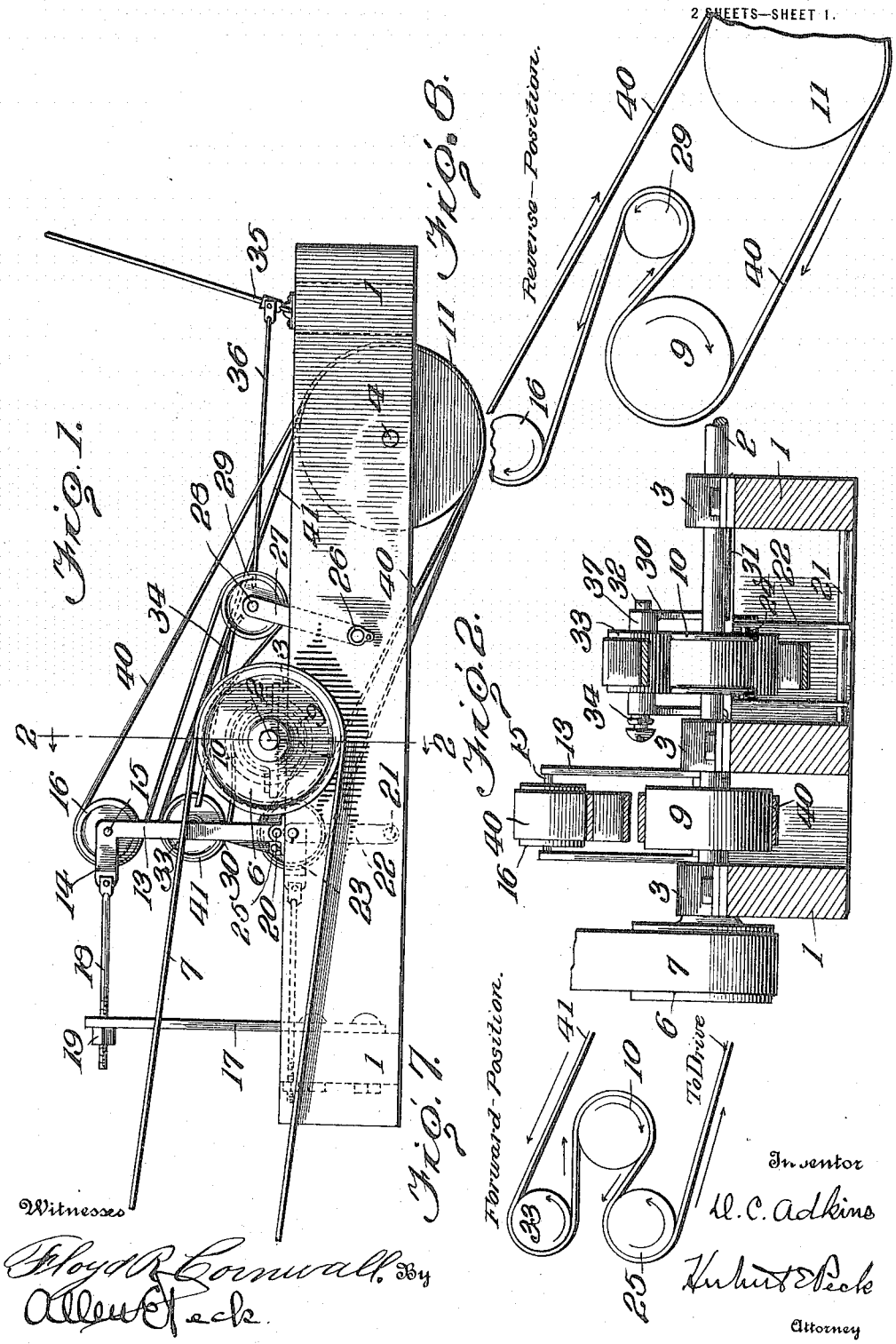
Witnesses
Floyd R Cornwall
Albert Peck
Inventor
D. C. Adkins
Hubert Peck
Attorney D. C. ADKINS.
GEARING.
APPLICATION FILED JULY 8, 1915.
1,197,090.
Patented Sept. 5, 1916.
2 SHEETS—SHEET 2.
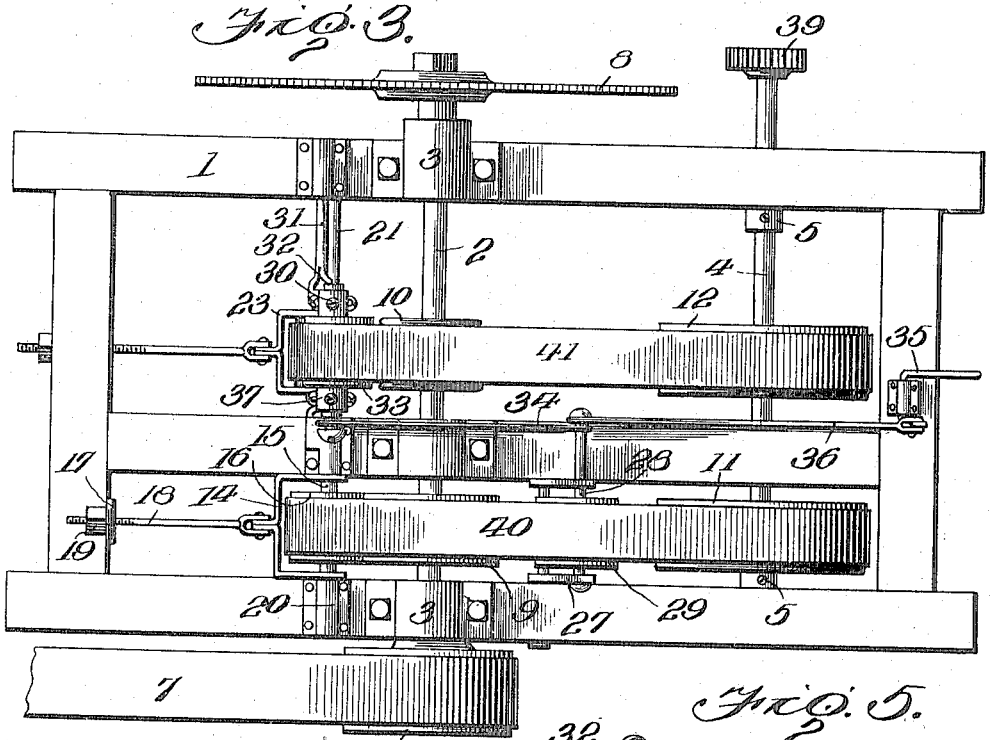
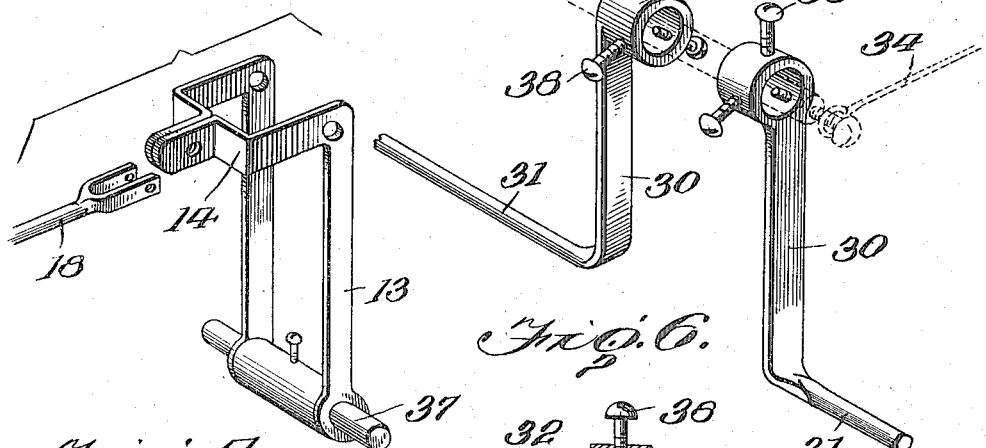
Witness
Floyd R. Cornwall
Allen E. Peck
Inventor
D. C. Adkins
Hubert E. Peck
Attorney.

UNITED STATES PATENT OFFICE.

DAVID CLAUDE ADKINS, OF WHITE HAVEN, MARYLAND.

GEARING.

1,197,090.  Specification of Letters Patent.  Patented Sept. 5, 1916.

Application filed July 8, 1915.  Serial No. 38,709.

*To all whom it may concern:*

Be it known that I, DAVID C. ADKINS, a citizen of the United States, residing at White Haven, in the county of Wicomico and State of Maryland, have invented certain new and useful Improvements in Gearing, of which the following is a specification.

This invention relates to certain improvements in saw mills and the objects and nature of the invention will be readily understood by those skilled in the art in the light of the following explanation of the accompanying drawings illustrating what I now believe to be the preferred embodiments among other formations, arrangements and constructions within the spirit and scope of my invention.

An object of the invention is to provide an improved driving and reversing mechanism for saw mills.

A further object of the invention is to provide a simple and efficient arrangement of pulleys and belting for saw mills.

A further object of the invention is to provide an arrangement of parts whereby the feed carriage of a saw mill may be reversed without a sudden jerking or straining of the driving and reversing mechanism.

A further object of the invention is to provide improved wood sawing machinery in which the cost of manufacture and the cost of maintenance are materially reduced.

A further object of the invention is to provide a feed carriage reversing mechanism comprising a plurality of pulleys and belts whereby the feed carriage may be moved backward and forward by tightening and loosening certain of the belts.

The invention consists in certain novel features of construction and formation and in combinations and arrangements as more fully and particularly set forth and pointed out hereinafter.

Referring to the accompanying drawings: Figure 1, is a side elevation. Fig. 2, is a vertical section taken on the line 2—2, Fig. 1. Fig. 3, is a top plan view. Figs. 4, 5, 6, are enlarged detail views of portions of my invention. Figs. 7 and 8, are diagrammatic views of the forward and reverse arrangement of the pulleys and belting of my invention.

Referring now to the particular embodiment illustrated, in the accompanying drawings, I show a frame 1, having the main or power shaft 2, mounted thereon in suitable bearings 3. A distance from the main or power shaft 2, is mounted a shaft 4, parallel to and below the shaft 2, in suitable bearings and provided with collars 5. The shaft 2, is provided at one end with the driving pulley 6, connected to any desirable motive power by a belt 7. A circular saw 8, is mounted upon the opposite end of the shaft 2, and a suitable distance from the frame to operate upon the work placed on a reciprocating carriage (not shown). Pulleys 9 and 10, are arranged on intermediate portions of the saw mandrel or driving shaft 2, and are keyed or otherwise fixed thereto to rotate therewith. On shaft 4, in alinement with pulley 9, on shaft 2, I show the pulley 11, fixed to rotate therewith and the pulley 12, fixed to rotate with shaft 4, in alinement with pulley 10.

Pivotally mounted on the frame at 20, and facing pulley 9, I show the standard 13, provided with a rearwardly extending portion 14, and an axle 15 at its upper end. Mounted to freely rotate upon the axle 15, is the pulley 16. Fastened on the rear of the frame 1, is the support 17, which is connected to the rearward extension 14, of the standard 13, by a rod 18. The rod 18, is screw threaded a distance along its end which passes through the support 17, and is provided with a nut 19, to permit longitudinal adjustment of rod 18, and consequent swinging movement of the frame or standard 13, to shift the position of the idler pulley 16, and to hold said pulley in the desired adjustment.

Pivotally mounted upon a rod 21, is a standard 22, having a rearward extension 23. This standard 22, is mounted to the rear of pulley 10, and is provided with an axle, 24, at its upper end on which is rotatably mounted a pulley 25, in alinement with the pulley 10. The pulley 25, is a distance below pulley 10. A device for adjusting the pulley 25, similar to that described on the standard 13, is used, but of course, I do not wish to limit myself to any particular form of adjusting device as any suitable means can be used without departing from the spirit and scope of my invention.

A distance below and forwardly of pulley 9, is a shaft 26, upon which is pivotally mounted a radial frame, arm or support 27, having an axle 28, upon which is revolubly mounted the pulley 29, in alinement with the pulley 9. Mounted to the rear of pulley 10, and having an upwardly extending portion 30, is a rocking shaft 31. The portion 30, carries an axle 32, upon which I show a pulley 33, freely rotatable thereon and in alinement with the pulley 10. This rock shaft 31 forms an upwardly extending radial swingable support, frame, or arm at its free end carrying the idler pulley 33, and corresponding to the upwardly extending swingable frame or arm 27, carrying the idler pulley 29. These swingable frames or arms 27, 30, are rockable on axes that are arranged at opposite sides of, spaced from, and parallel with the driving shaft 2, and said two frames are coupled together to swing in unison by a connecting rod 34, which maintains said frames in fixed relation with respect to each other.

On the front of frame 1, I mount the lever, or other suitable means 35, connected to a rod 36, which is fastened to the support 27. The lever 35 is so connected with the rod 36, that a movement of the lever will cause a movement of the pulleys 29, and 33. The standards or supports which carry the pulleys 29 and 33, are pivoted in such a manner that they are swingable eccentrically with respect to shaft 2, and the lever 35, with the rods 34, and 36, connecting it with the pulleys 33, and 29, will permit these pulleys to be simultaneously moved forwardly or rearwardly by moving the lever 35, forwardly or rearwardly.

Referring now particularly to Fig. 5, of the drawings, where I show the upwardly extending portions 30, of the rocking shaft 31, which support the pulley 33 and the means for adjusting the axle and shaft mounted thereon. The upper ends of the portions 30, are enlarged forming bearings 37. Screws 38, working in threaded holes around the bearings, form means for adjusting and maintaining the axle 32 in position. It is understood, of course, that any desirable or suitable form, type, or class of pulleys can be employed. Pulleys of light steel construction are preferable but not essential to the invention. The pulley 10, is preferably of the flanged type but I do not wish to so limit myself to such type. The shaft 2, carrying the saw 8, is rotated by the pulley 6, and belt 7, which is operated by any suitable motive power. The shaft 4, by means of the pinion 39, operates a reciprocating work supporting carriage (not shown) and it is necessary to reverse the movement of this carriage after each cutting made by the saw 8. The movement of the work carriage is imparted through the rotation of the pinion 39, in mesh with a rack (not shown) mounted on a carriage (not shown), and to cause a reciprocating movement of said carriage the shaft 4, carrying the pinion 39, is rotated first in one direction, then in the other. The means by which this alternate rotation of the shaft 4, is accomplished is the essential feature of my invention, and I will proceed hereinafter to describe the arrangement of belts upon the hereinbefore described pulleys which enables a person to reverse the shaft 4, when necessary without reversing the direction of rotation of the main shaft, without stopping said shaft, and without the usual jar, jerk and straining upon the machine or mill which usually occurs during such operations. The rotation of the shaft in one direction is accomplished by one series of alined pulleys and an endless belt and in the opposite direction by another series and endless belt. These pulley and belt arrangements are shown diagrammatically in Figs. 7 and 8, of the drawings. I show the belt 40, passing over and around the series of alined pulleys, 11, 9, 29 and 16, and the belt 41, passing over the series of alined pulleys, 12, 33, 10, and 25. In each series of pulleys there is one which is controlled by the lever 35 and can be moved so as to loosen the belt on the series or to tighten the belt. These two pulleys are moved simultaneously and are on opposite sides of the drive shaft 2, so that a complete swinging movement of these pulleys will always loosen and render one belt inoperative, and tighten and render the other belt operative or vice versa, according to the direction the movement takes. The pulleys and belt in each series are so arranged that one belt rotates the shaft 4, in one direction and the other belt when operated rotates the shaft 4, in the opposite direction. In this arrangement the reversing of the shaft 4, is accomplished without any sudden jerking or straining of any of the parts of the device. The shaft 4, may be reversed at any time and at any speed for the pivoted pulley in a series may be moved gradually from the main shaft thereby gradually tightening the belt on all the pulleys until all surfaces grip and are rotated thereby without slipping. The movement of the two pivoted pulleys is very small, it only being necessary to move them sufficiently for the belt to slip and fail to transmit the rotation or for them to tighten the belt and cause it to take hold and transmit the power from the main shaft 2, to the shaft 4.

The operation of my device is as follows: The main shaft 2, may be rotated either to the right or left, but for purposes of explanation take the shaft 2, as rotating to the right. To rotate the shaft 4, with the pinion 39, to the left the lever 35, would be operated to cause the pulleys 29 and 33, to move in a direction away from the shaft 4, which would tighten the belt 41, and place its series of pulleys into operation and would loosen the belt 40 on its series of pulleys and place them in inoperative position. Then the pulley 10, rotating to the right due to the position of the two pulleys, 33 and 25, and the manner of passing the belt 41 over them will rotate the shaft 4, in a direction opposite to the direction of rotation of shaft 2. Now, to reverse the shaft 4, and rotate it to the right, the lever 35, is moved to pull the pulleys 29 and 33, in a direction toward the shaft 4, which will loosen belt 41, and throw it out of operation and will tighten the belt 40, causing it to rotate the shaft 4, through the pulley 11. The rotation of shaft 4, when operated by the series of pulleys 16, 29, and 9, will be to the right.

It will be noted that the belts 40, 41, are so arranged with respect to the driving shaft 2, that the lateral or radial strain of one belt on the shaft is in the opposite direction to the lateral or radial strain of the other belt on said shaft, and that one belt hence counteracts the tendency of the other belt to throw said shaft from proper adjustment and the saw out of balance or from proper position. This counterbalancing action of the belts on the driving shaft is due to the fact that one belt occupies, say, the right hand portion of its driving pulley, while the other belt occupies the left hand portion of its driving pulley, with one belt pulling in one direction from, say, the upper portion of its pulley, and the other belt pulling in the opposite direction say, from the lower portion of its pulley. Any wear or any stretching of the belts may be overcome by adjusting the pulleys 16 and 25, by means of the rods shown in the drawings, and the axle 32, on the rocking shaft 31, may be adjusted by means of the screws 38.

The device illustrated and described, overcomes a great many of the defects in mechanisms of this class and is very simple and inexpensive to manufacture and to operate.

It is evident that various changes, variations, modifications and departures might be resorted to in the forms, constructions, arrangements and various combinations disclosed without departing from the spirit and scope of my invention, and hence I do not wish to limit myself to the exact disclosures hereof, but consider myself entitled to all such departures that fall within the terms of my invention in whole or in part.

What I claim is:

1. In combination, a driving shaft adapted to be constantly rotated in one direction, a driven shaft, two series of pulleys and belting connecting said shafts, one series adapted to drive the driven shaft in one direction and the other series in the opposite direction, one series comprising pulleys on the driving and driven shafts, an idler pulley, a belt-controlling pulley bodily movable toward and from the driving shaft, and an endless driving belt mounted on said four pulleys with its inner side engaging the pulley on the driving shaft and with said idler and controlling pulleys arranged in bights of said belt forming part of the length of the belt between corresponding sides of the pulleys on the driving and driven shafts, the other series comprising pulleys on the driving and driven shafts, an idler pulley, a belt-controlling pulley bodily movable toward and from the driving shaft, and an endless driving belt mounted on said four pulleys and having its outer surface in engagement with the pulley on the driving shaft, said belt having a bight in one length between the driving and driven shafts receiving said idler pulley and another bight in the other length between said shafts and receiving said controlling pulley, and means for simultaneously moving said controlling pulleys of the two series to alternately throw said belts into and from operative adjustment.

2. In combination, a driving shaft adapted to be constantly rotated in one direction, a driven shaft, a belt driving pulley on the driving shaft, a pulley on the driven shaft, an endless driving belt between said pulleys and having its inner surface in engagement with its said driving pulley, idler pulleys engaging said belt and one idler pulley forming with the same a bight in which its said driving pulley is located, one of said idler pulleys being bodily movable to throw said belt to and from operative driven engagement with its driving pulley, another set of pulleys on the driving and driven shafts, an endless driving belt on said last mentioned pulleys and having its outer surface in engagement with its driving pulley, idler pulleys engaging said last mentioned belt and one idler pulley forming with the same a bight receiving its said driving pulley, one of said last mentioned idler pulleys being bodily movable to throw said belt to and from operative driven engagement with its said driving pulley, and controlling means for simultaneously moving said bodily movable idler pulleys, substantially as described.

3. In combination, a driving shaft, a driven shaft, a pair of belt driving pulleys on the driving shaft, a pair of corresponding belt driven pulleys on the driven shaft, a pair of endless driving belts connecting said shafts and arranged on said pulleys, idler pulleys forming bights in said belts receiving said belt driving pulleys, the bight of one belt presenting the inner surface of the belt in operative relation to its driving pulley, the bight of the other belt presenting the outer surface of the belt in operative relation to its driving pulley, whereby the belts are adapted to be driven in opposite directions, and manually operative means for simultaneously tightening either belt into operative driving engagement with its driving pulley and loosening the other belt to inoperative relation with respect to its driving pulley, substantially as described.

4. In combination, a driving shaft adapted to be constantly rotated in one direction, a driven shaft, two series of pulleys and belting connecting said shafts, one series adapted to drive the driven shaft in one direction and the other series in the opposite direction, one series comprising pulleys on the driving and driven shafts, an endless driving belt mounted thereon, an idler pulley and a belt controlling pulley bodily movable to tighten and loosen said belt into operative and inoperative relation with its driving pulley, the other series comprising pulleys on the driving and driven shafts, an idler pulley, a belt-controlling pulley bodily movable toward and from the driving shaft, and an endless driving belt mounted on said four pulleys and having its outer surface in engagement with the pulley on the driving shaft, said belt having a bight in one length between the driving and driven shafts receiving said idler pulley and another bight in the other length between said shafts and receiving said controlling pulley, and means for simultaneously moving said controlling pulleys of the two series to alternately throw said belts into and from operative adjustment, substantially as described.

5. In combination, a driving shaft, a driven shaft, a pair of belt driving pulleys on the driving shaft, a pair of corresponding belt driven pulleys on the driven shaft, a pair of endless driving belts connecting said shafts and arranged on said pulleys, said belts being arranged to drive said driven shaft in opposite directions, one of said belts having a bight receiving its driving pulley and presenting the outer surface of the belt thereto, an idler pulley, a swinging arm mounted on an axis, eccentric to the driving shaft and carrying said idler pulley, adjusting means for said swinging arm, said last mentioned belt forming a bight receiving said idler pulley, a frame swingable on an axis eccentric with respect to said driving shaft and with respect to said previously mentioned axis, a belt-controlling pulley carried by said frame, said last mentioned belt having a bight receiving said controlling pulley, belt-controlling means for said other belt for throwing the same into and from driven adjustment with respect to its driving pulley, and manually operated means for simultaneously swinging said frame and operating said belt-controlling means to throw either belt into action and the other belt out of action.

6. In combination, a driving shaft adapted to continuously rotate in one direction, a pair of belt driving pulleys thereon, a driven shaft, a corresponding pair of belt driven pulleys on the driven shaft, a pair of endless belts on said pulleys and arranged to rotate the driven shaft in opposite directions, a swingable arm, an idler pulley at the free end thereof, one of said belts having a bight receiving said pulley, adjusting means for swinging and holding said arm to take up slack in said belt on the pulley carried by said arm, a swingable frame, a belt-controlling pulley at the free end thereof, said last mentioned belt having another bight receiving said controlling pulley, controlling means for the other belt, and manually operated means for simultaneously swinging said frame and operating said controlling means to throw either belt into action and the other belt out of action, substantially as described.

7. In combination, a driving shaft, a pair of belt driving pulleys thereon, a driven shaft, a corresponding pair of belt driven pulleys on the driven shaft, a pair of endless driving belts adapted to drive the driven shaft in opposite directions, a pair of swingable arms, pulleys engaging the belts and carried by said swinging arms, means to swing the arms to take up slack in the belts and to hold the arms in the desired adjustments, a pair of swingable frames coupled together in fixed relation, belt controlling pulleys carried by said frame and engaging bights of the belts to tighten and loosen the belts against and with respect to their driving pulleys, and manually controlled operating means for swinging said frames to simultaneously tighten one belt and loosen the other belt, substantially as described.

8. In combination, a driving shaft, a driven shaft, two series of pulleys and belting connecting said shafts, one series comprising a pulley on said driving shaft, a pulley on said driven shaft, an idler pulley mounted a distance from and rearwardly beyond the driving shaft, a bodily movable belt-controlling pulley mounted between said shafts, and an endless belt connecting said pulleys, the other series comprising a pulley on said driving shaft, a pulley on said driven shaft, a pulley mounted a distance from and rearwardly beyond said last mentioned driving pulley, a bodily-movable belt-controlling pulley mounted a distance from and rearwardly from said driving pulley, and an endless belt connecting said pulleys, one of said series adapted to rotate said driven shaft in one direction and the other series in the reverse direction, and means joining said bodily-movable pulleys for moving the same to render said series alternately operative and inoperative through the action of said pulleys upon their respective belts.

9. A device of the character substantially as described, comprising a driving shaft and a driven shaft, a pulley on said driving shaft, a pulley on said driven shaft alined therewith, a swingable arm at the rear of said driving shaft extending a distance thereabove, a pulley mounted therein and alined with said driving shaft pulley, a vertical swingable frame in front of said driving shaft, a pulley mounted therein in alinement with said driving shaft pulley, an endless belt connecting said pulleys, a second pulley on said driving shaft, a second pulley on said driven shaft alined therewith, a swingable arm at the rear of said driving shaft, a pulley in alinement with said last mentioned shaft pulleys and carried by said swingable arm, a swinging frame at the rear of said driving shaft, a pulley in alinement with said shaft pulleys and mounted at the upper end of said swinging frame, an endless belt connecting said second set of pulleys and adapted to drive said driven shaft in the opposite direction to the first mentioned belt, and means adapted to alternately place said belts in operative adjustment.

10. A device of the character substantially as described, comprising a driving shaft and a driven shaft, sets of alined pulleys on said shafts, idler pulleys interposed at suitable positions in alinement with said shaft pulleys forming two alined sets of pulleys, endless belts on the pulleys of each set and arranged, respectively, to rotate the driven shaft in opposite directions, and means for alternately placing each set in operative position consisting of swingable frames on opposite sides of said driving shaft, certain of said idler pulleys being mounted in the upper ends of said frames, respectively, and manually controlled means for simultaneously swinging said frames comprising a connection joining said frames in fixed relation.

11. A device of the character substantially as described, comprising a driving shaft and a driven shaft, a set of alined pulleys, and an endless belt connecting said shafts and arranged to rotate said driven shaft in one direction, a second set of alined pulleys and an endless belt connecting said shafts and arranged to rotate said driven shaft in a direction opposite to that of said first set, and means whereby one set is maintained in inoperative position and the other in operative position and vice versa, consisting of swingable frames mounted on opposite sides of said driving shaft, pulleys carried by said frames, one of said pulleys alined with one of said sets and the other pulley alined with the other set, each of said pulleys adapted to support its respective belt and form a turning point therefor, and means for swinging said frames simultaneously to move one pulley thereof in a direction to loosen its belt and the other pulley thereof in a direction to tighten its belt and vice versa, substantially as described.

In testimony whereof I affix my signature.

DAVID CLAUDE ADKINS.

Copies of this patent may be obtained for five cents each, by addressing the "Commissioner of Patents, Washington, D. C."